Aug. 15, 1967

S. A. STERN 3,335,550

CRYOSORPTION APPARATUS

Filed Oct. 6, 1966

INVENTOR.
SILVIU A. STERN

BY John C. Kidner

ATTORNEY

INVENTOR.
SILVIU A. STERN
BY John P. Lerner
ATTORNEY

United States Patent Office 3,335,550
Patented Aug. 15, 1967

3,335,550
CRYOSORPTION APPARATUS
Silviu A. Stern, Buffalo, N.Y., assignor to Union Carbide
Corporation, a corporation of New York
Filed Oct. 6, 1966, Ser. No. 598,548
11 Claims. (Cl. 55—208)

This application is a continuation-in-part of Ser. No. 362,878, filed Apr. 24, 1964, now abandoned.

This invention relates to apparatus for rapidly evacuating spaces by cryosorption; that is, by providing a refrigerated adsorbent material in gaseous communication with the space to be evacuated.

While the increasing interest in producing high vacuums, such as required for space simulation chambers, means have been sought to improve evacuation techniques. Mechanical vacuum pumps and oil diffusion pumps, that have been previously employed, are usually not capable of producing high degrees of vacuum desired with adequately fast pumping speeds. Furthermore, such pumps usually contaminate the evacuated space with back-diffused lubricant vapors.

One means for rapid evacuation of spaces cleanly is by cryosorption, which utilizes the substantial increase in physical adsorption capacity of various adsorbent materials when such materials are refrigerated to a low temperature. So-called "cryosorption vacuum pumps" have been developed which are capable of rapidly pumping a space from atmospheric pressure down to pressures on the order of $10^{-2}$ to $10^{-4}$ torr. employing zeolitic molecular sieve adsorbents refrigerated to liquid nitrogen temperatures.

It is an object of this invention to provide a cryosorption pump capable of producing a vacuum of $10^{-2}$ to $10^{-5}$ torr. when refrigerated to liquid nitrogen temperatures and capable of producing commensurately lower pressures when refrigerated to lower temperatures. It is another object to provide a cryosorption pump capable of producing a desired degree of vacuum more rapidly than heretofore possible with a given amount of adsorbent material refrigerated to a given low temperature. These and other objects and advantages of the present invention will become apparent from the following description and drawings, of which:

Figure 1:
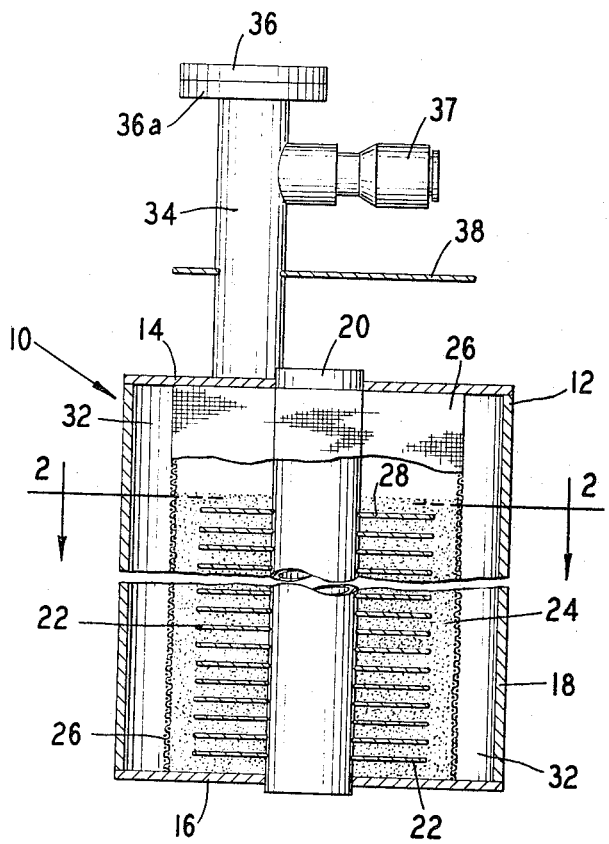
FIGURE 1 is a view in vertical cross-section of one embodiment of the present invention.

The cryosorption apparatus (or "pump" as it is commonly known) of the present invention is designed to be connected to a space to be evacuated by suitable means such as a conduit. It comprises a gas-tight casing which houses a heat exchanger having at least one refrigerant fluid conduit with extended heat transfer surfaces attached to the outer surface of the conduit, and gas inlet means connected to the casing. The extended heat transfer surfaces are surrounded and substantially completely covered by a bed of adsorbent material which is enclosed by screen retaining means. The latter supports and holds the adsorbent bed in physical contact with the extended heat transfer surfaces so as to provide a direct path for heat transfer therebetween. The screen retaining means is positioned inwardly of the casing to provide an annular gas conductance space between the casing and the screen retaining means with the outer surfaces of the sides of the adsorbent bed directly exposed to such space. The annular gas conductance space, so provided, may be circular, rectangular or other configuration depending on the geometry of the casing and the screen retaining means; the essential feature being that the gas conductance space is provided around the outer periphery of the heat exchanger so that a large surface area of the adsorbent bed is exposed thereto. The adsorbent material must substantially completely cover the extended heat transfer surfaces.

The heat exchanger employed in the cryosorption pump of this invention preferably comprises one or more liquid refrigerant tubes which extend through the interior of the casing and connect to the casing ends. Each refrigerant tube preferably has extended heat transfer surfaces in the form of heat transfer fins attached to the tube outer surface along a substantial portion of the tube length. If fins of sufficient surface area are provided, several tubes could share the same set of fins, but in the preferred practice of this invention, each tube is provided with a separate set of fins.

Where a plurality of refrigerant tubes of the finned-type, for example, are provided, the adsorbent bed could be divided into sections with each section embedding a single finned (i.e. extended-heat-transfer-surfaced) tube, and the screen retaining means could be appropriately divided in sections also with each section enclosing the fins of a single tube. However, it is preferable from the standpoint of compactness to enclose all of the finned tubes in a unitary bed. Also, although a plurality of tubes could be aligned in a plane, embedded in a unitary adsorbent bed, and enclosed by a screen retaining means of a rectangular cross-sectional configuration, it is preferable from the standpoint of compactness to align the tubes into a cylindrical annulus and enclose the inner and outer peripheries of the corresponding annular unitary adsorbent bed with screen retaining means.

The casing and heat exchanger construction of this invention can be immersed in a body of refrigerant liquid so that such liquid freely circulates through the heat exchanger or the assembly can be connected to a refrigeration system which will circulate refrigerant fluid (either liquid or gas) through the heat exchanger in a closed cycle. In the latter case, when the heat exchanger comprises a plurality of conduits, such conduits may be connected in series or parallel as desired.

Any adsorbent material is suitable for use in this invention with the synthetic crystalline aluminosilicates, known commercially as molecular sieves, being preferred. Exemplary molecular sieves include zeolite A as described in U.S. Patent No. 2,882,243 and zeolite X as described in U.S. Patent No. 2,882,244. Alternative adsorbent materials include silica gel and activated charcoal.

Figure 2:
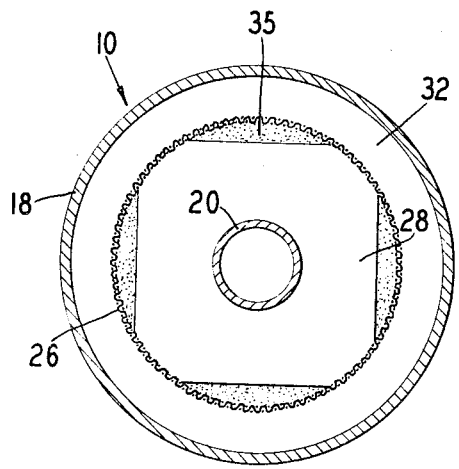
FIGURE 2 is an end view of the FIGURE 1 embodiment taken along the lines 2—2.

FIGURES 1 and 2 show an embodiment 10 of the present invention comprising a gas-tight casing 12 having top, bottom, and side walls 14, 16 and 18, respectively, a refrigerant tube 20 enclosed by casing 12 and having exterior heat transfer fins 22 embedded in a packed bed of adsorbent material 24. The adsorbent bed is retained by screen retaining means 26 and is provided in sufficient quantity to just cover the uppermost heat transfer fin 28 such that an inlet manifold space 30 is provided between heat transfer fin 28 and the top wall 14 of casing 12. Screen retaining means 26 is positioned inwardly of casing side wall 18 to provide an annular gas space 32 therebetween. Inlet means 34 is connected to the casing top wall 14 in gaseous communication both with inlet manifold space 30 and annular space 32. As shown in FIGURE 2, in this embodiment, the heat transfer fins 22 are preferably of rectangular configuration, and the screen retaining means 26 of circular configuration so that a space or spaces 35 are provided to facilitate filling and emptying the casing with adsorbent material. Inlet means 34 is preferably positioned to open into space 30, enclosed by screen retaining means 26, as shown, so that casing 12 can be conveniently filled and emptied therethrough on removing inlet means cap 36.

The embodiment shown in FIGURES 1 and 2 may be connected to a refrigerant system so that a refrigerant fluid, such as liquid nitrogen or some other cryogenic liquid, can flow through refrigerant tube 20 thereby cooling the adsorbent bed.

This embodiment may also be immersed in a liquid refrigerant so that refrigerant tube 20 will be filled with liquid refrigerant. In this latter case, as the liquid refrigerant is warmed by heat exchange with the adsorbent bed, it will be conducted out of the top end of refrigerant tube 20 and replaced by cold refrigerant flowing in through the bottom end. Also, in this latter case, deflector plate 38 may be positioned above refrigerant tube 20 to turn the warmer refrigerant leaving the refrigerant tube back into the surrounding liquid body within which the cryosorption apparatus 10 is immersed.

To connect the apparatus in gaseous communication with the chamber to be evacuated, cap 36 is removed and a gas conductance conduit attached to flange 36a. If desired, a valve means may be provided in such gas conductance conduit to shut the apparatus from the evacuated chamber. This latter feature is particularly desirable if the apparatus is to be purged of adsorbed gases through valve means 37 while the apparatus is connected to the evacuated chamber.

Figure 3:
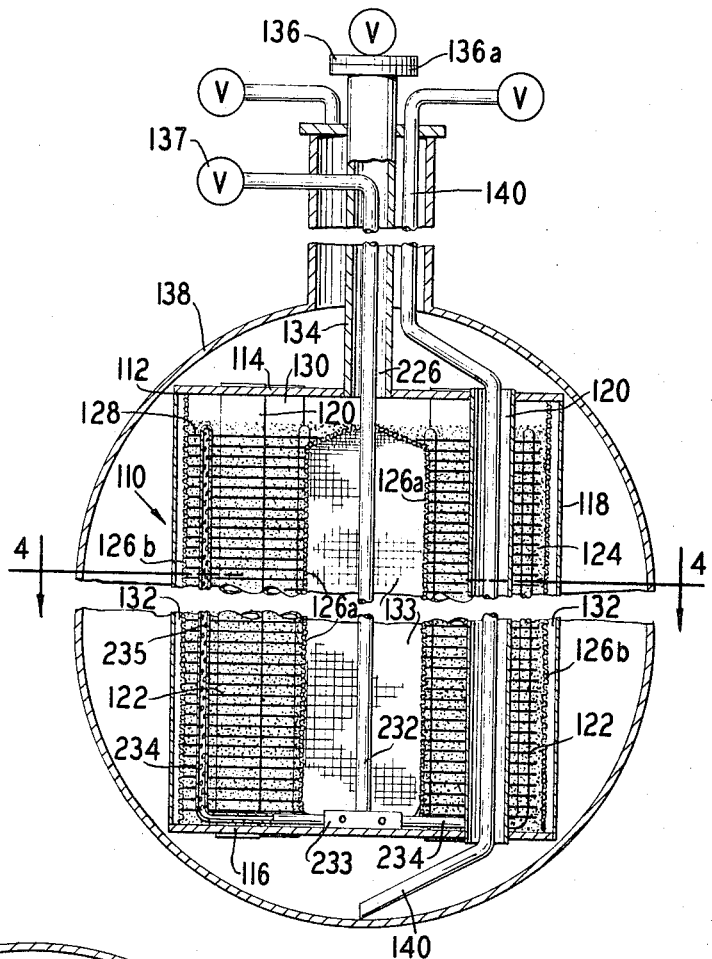
FIGURE 3 is a view in vertical cross-section of another embodiment of the present invention.
Figure 4:
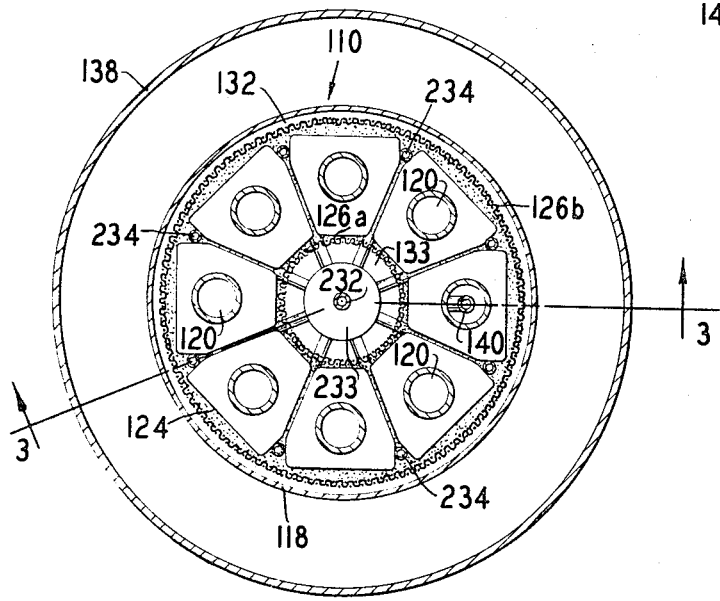
FIGURE 4 is an end view of the FIGURE 2 embodiment taken along the lines 4—4.

FIGURES 3 and 4 show a more complex embodiment 110 of the present invention of larger capacity than the embodiment of FIGURES 1 and 2. The present embodiment comprises a gas-tight casing 112 having top, bottom and side walls 114, 116 and 118, respectively, a plurality of refrigerant tubes 120 enclosed by casing 112 and arranged in an annulus about the longitudinal center line of the apparatus. Each refrigerant tube 120 has exterior heat transfer fins 122 along a major portion of its length which are embedded in a packed bed of adsorbent material 124. The adsorbent material is provided in sufficient quantities to just cover the uppermost heat transfer fin 128 of each such that an annular space 130 is provided between the heat transfer fins 128 and the casing top wall 114. The adsorbent material is retained by screen retaining means in the form of concentric inner and outer retainers 126a and 126b respectively, to provide an outer annular gas space 132 between the casing side wall 118 and the outer retainer 126b, and to provide an inner cylindrical space 133 within the inner retainer 126a. Inlet means 134 is connected to the casing top wall 114 in gaseous communication with space 130, outer annular space 132 and inner cylindrical space 133. The side edges of the heat transfer fins are preferably radially aligned as shown in FIGURE 4 thereby providing a pie-shaped fin surface so that the finned refrigerant tubes 120 can be closely spaced together. Alternately, annular fins could be provided with vertically-aligned openings for each of the refrigerant tubes 120. Inlet means 134 is preferably positioned along the longitudinal centerline of casing 112 as shown in FIGURE 3 to facilitate filling and emptying the casing with adsorbent material on removing inlet means cap 136.

The embodiment shown in FIGURES 3 and 4 may be connected to a refrigeration system so that a refrigerant fluid, such as liquid nitrogen or some other cryogenic liquid, can flow through the refrigerant tubes 120 thereby cooling the adsorbent material. The refrigerant tubes 120, in this case, may be manifolded-top and -bottom either in parallel or in series as desired.

This embodiment may also be immersed in a liquid refrigerant contained within a vessel as shown in FIGURE 3. The vessel 138 shown in FIGURE 3 is constructed around the cryosorption apparatus 110 to provide an integral cryosorption unit. However, vessel 138 could be constructed that the cryosorption apparatus 110 is easily insertable and removable. The vessel 138 shown in FIGURE 3 is conveniently provided with a refrigerant liquid fill line 140.

To connect the apparatus in gaseous communication with the chamber to be evacuated, cap 136 is removed and a gas conductance conduit attached to flange 136a. If desired, a valve means may be provided in such gas conductance conduit to shut the apparatus from the evacuated chamber. This latter feature is particularly desirable if the apparatus is to be purged of adsorbed gases through valve means 137 while the apparatus is connected to the evacuated chamber.

The ultimate pressure obtained in any cryosorption-pumped system for a given gas will depend on the volume of gas to be pumped and the gas conductance of the piping between the pump and the evacuated chamber. An important feature of the present invention is that the internal gas conductances of the cryosorption apparatus are matched at all points, i.e., the gas conductance of the annular space surrounding the adsorbent bed is at least equal to the gas conductance of the inlet passageway and therefore the internal conductance of the cryosorption apparatus does not limit the capacity of the apparatus, nor the rapidity at which it can evacuate a chamber.

A most important feature of the present invention is the ability of the apparatus to receive and adsorb large quantities of gas and to transfer the resulting heat of adsorption to the refrigerant fluid rapidly enough to avoid warm spots and maintain a minimum $\Delta T$ between the adsorbent bed and the refrigerant liquid. To satisfactorily attain this objective, it has been found necessary to provide at least 70 sq. feet of heat transfer surface area (predominately provided by the fin surfaces) per cu. ft. of adsorbent material, with the heat transfer area preferably being at least six times greater than the area of the adsorbent bed (predominately provided by the side surfaces of the adsorbent bed retained by the screen retaining means) exposed to the surrounding gas space. Because of the low thermal conductivity of the adsorbent material, the adsorbent bed depth (one half the distance between adjacent heat transfer fins in the present invention) should remain small, preferably less than about ¼ inch, and the ratio of the heat transfer surface area to the product of the bed depth and the volume of adsorbent material should be as large as possible—at least 6000 for optimized performance.

After obtaining a pressure in the transitional gas flow region, to be able to achieve very low ultimate evacuated pressures of $10^{-4}$ torr. or lower the ability to maintain a very low $\Delta T$ between the adsorbent bed and the refrigerant liquid becomes of paramount importance. To assure that the $\Delta T$ is sufficiently small, the ratio of the heat transfer surface area to the product of the exposed area of the adsorbent bed and the adsorbent bed depth should exceed 20 ft.$^2$/ft.$^3$.

In addition to the foregoing parameters, the volume of adsorbent used should constitute between about 30–75% of the gross volume of the apparatus casing for efficient pump design.

Whenever the adsorbent requires reactivation for any reason, such as adsorption of water vapor or other gases, desorption may be accomplished quickly and efficiently by passing warm (e.g. 300° C.) purge gas (e.g. nitrogen) through the bed. Specifically, the warm gas is passed down inlet tube 232 to lower manifold 233, and thence through individual tubes 234 having holes 235 located to communicate with each adsorbent filled space between the tube fins. This construction assures complete reactivation since the warm reactivating gas is passed through substantially all the adsorbent bed and is removed through pumping passage 226.

If a warm pump is connected to the space to be evacuated, pumping commences when the adsorbent is cooled such as by adding the refrigerant liquid. Alternately, if the cryopump is already cold, pumping of the space commences as soon as the cold pump is connected thereto. A space can be evacuated to a lower pressure using a liquid nitrogen refrigerated cryosorption pump if the space is first purged with nitrogen gas to substantially remove trace molecules of lower boiling gases such as neon, hydrogen and helium. For a particular pump design, ultimate pressures of $10^{-6}$ torr. can be obtained when pumping nitrogen gas compared to $10^{-3}$ to $10^{-4}$ torr. when pumping air.

Because of the rapid pumping speed of these improved cryopumps, a gas sweeping action occurs which draws into the adsorbent and momentarily traps molecules of lower boiling gases such as hydrogen, neon and helium. If the pump shutoff valve in the inlet means is closed promptly before such molecules can escape from the pump, a lower than equilibrium pressure can be attained. Such non-equilibrium pumping procedures are possible only with pumps having fast pumping rates. Also, two or more pumps may be used sequentially if desired, with the second pump being capable of producing lower pressures by being provided with increased conductance area (i.e., larger mouth opening) or refrigerated to a lower temperature.

Whenever reactivation is desired, the refrigerant is removed and the adsorbent warmed by suitable means, preferably by passing warm gas through the adsorbent uniformly as described previously. Such reactivation means is particularly desirable if the pump is integrally installed in an insulated dewar.

Figure 6:
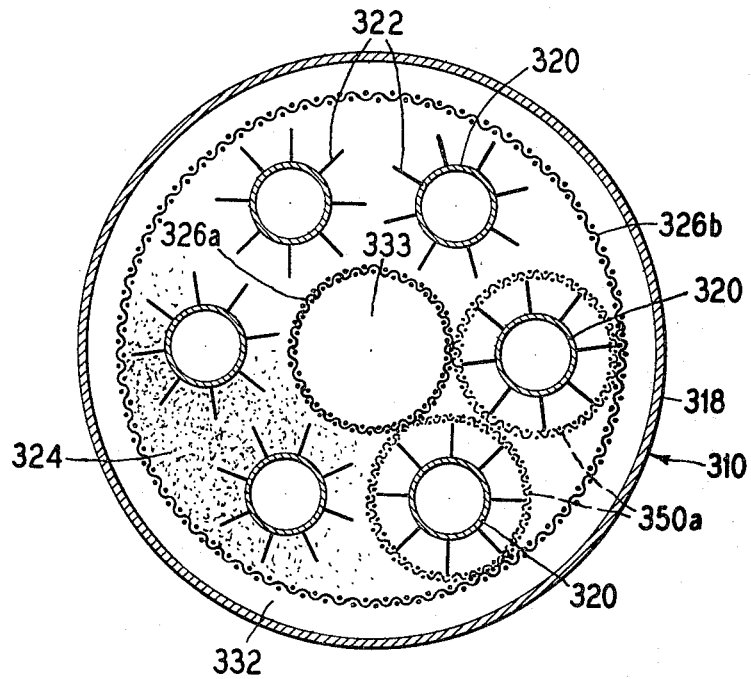
FIGURE 6 is an end view of the FIGURE 5 embodiment taken along the line 6—6.
Figure 5:
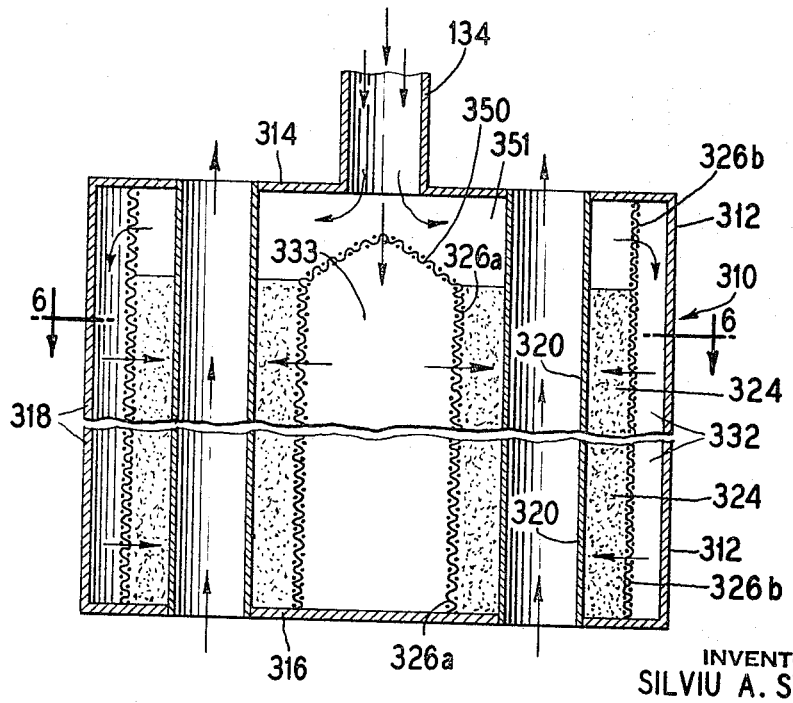
FIGURE 5 is a view in vertical cross-section of another embodiment in which the spaced fin members are positioned parallel instead of normal to the refrigerant conduit exterior surface.

FIGURES 5 and 6 show another embodiment 310 of the present invention which is especially suited for larger capacity as characterized by the FIGURES 3 and 4 apparatus, yet has certain features in common with the FIGURES 1 and 2 apparatus. For purposes of comparison, items corresponding to items in the other drawings have been identified by numbers having the same last two digits.

Gas-tight casing 312 includes top, bottom and side walls 314, 316 and 318 respectively, and a plurality of refrigerant tubes 320 enclosed by casing 312 and arranged in an annulus about the longitudinal center line of the appartus. Each refrigerant tube 320 has exterior heat transfer fins 322 spaced from each other around the tube exterior surface and fixedly attached thereto. Fins 322 are positioned substantially parallel to the tube 320 exterior vertical surface, in contrast to the horizontal fins of the other illustrated embodiments. Alternatively, fins 322 may be positioned at angles intermediate the horizontal and vertical alignments. The outer edges of fins 322 are spaced from the inner surface of casing side wall 318 to provide outer annular gas space 332.

Adsorbent material 324 surrounds fins 322 and fills the space therebetween as a bed, being enclosed by concentric inner and outer screw retainers 326a and 326b. Inner screen retainer 326a encloses inner cylindrical space 333 covered at its upper end by cone-shaped screen deflector 350 and sealed at its lower end by bottom wall 316. Outer screen retainer 326b extends to the casing top wall 314 inwardly from side wall 318 to form outer annular gas space 332. Although a single outer screen retainer 326b is illustrated surrounding all of the refrigerant tube 320-heat transfer fin 322 assemblies, individual outer screen retainers 350a could be employed for each assembly. In this construction, the adsorbent material 324 would be retained within the individual cylindrically shaped screens 350a surrounding the fins 322 attached to each refrigerant tube 320.

As another variation, the longitudinally finned tubes 320 may be positioned more closely together than depicted, with the fins 322 of adjacent tubes overlapping. The fins 322 may be perforated if desired for more uniform gas distribution within the adsorbent bed.

In operation, the cryosorption pump 310 may be immersed in a body of refrigerant liquid in the same manner as the FIG. 3-4 apparatus, employing outer casing 138. Alternatively, the refrigerant may be continuously circulated through tubes 320, preferably entering the lower end and discharging through the upper end.

The conduits for adsorbate gas, purge gas and adsorbent reactivation gas are not shown in the interest of simplicity, but are very similar to the FIG. 3 embodiment and will be apparent therefrom to those skilled in the art. These individual conduits may be positioned within inlet conduit 134 extending through casing top wall 314 and concentrically aligned with respect to the casing over screen deflector 350.

Once the adsorbent material 324 is cooled by longitudinally aligned fins 322 which in turn are cooled by cryogenic liquid within tubes 320, the adsorbate gas is admitted to casing 312 through inlet conduit 134. One portion of this gas flows downwardly through screen deflector 350 to inner cylindrical space 333 and thence radially outwardly into the adsorbent bed 334, between fins 322. The remaining portion of adsorbate gas is outwardly diverted by screen deflector into header space 351 above the adsorbent bed 324. The heat transfer fins 322 are completely surrounded by this adsorbent bed 324, including the fin upper and lower edges. A minor part of this diverted gas flows directly downwardly into the bed 324 between fins 322. The largest part of the diverted adsorbate gas flows through the upper end of outer screen retainer 326b into the outer annular gas space 322, and thence radially inward through the adsorbent bed.

Although preferred embodiments of the invention have been described in detail, it is to be understood that modifications and variations may be effected without departing from the spirit and scope of the invention.

What is claimed is:

1. Cryosorption apparatus which comprises: a gas-tight casing having end and side walls; a heat exchanger positioned within the casing and comprising at least one refrigerant conduit longitudinally coextensive with the casing side walls and between the casing end walls; refrigerant inlet means communicating with one end of said refrigerant fluid conduit and refrigerant outlet means communicating with the opposite end of said refrigerant fluid conduit, a multiplicity of extended surface solid fin members spaced parallel to each other along the major portion of the refrigerant fluid conduit exterior surface, being fixedly attached to and extending substantially normal to and outwardly from such exterior surface with outer edges spaced from the inner surfaces of the casing side walls; screen retaining means enclosing the fin member outer surfaces and spaced inwardly from and substantially parallel to the casing side wall inner surface to form an annular space therebetween; a bed of adsorbent material packed around said fin members and filling the space therebetween, being enclosed by said screen retaining means such that said fin members are substantially completely surrounded by said adsorbent material with the outer periphery of said bed being directly exposed to said annular space; and gas inlet means connected to said casing in gaseous communication with the adsorbent bed and said annular space.

2. Cryosorption apparatus according to claim 1 wherein a plurality of refrigerant fluid conduits are provided and arranged in a cylindrical annulus and attached to the end walls of said casing; and wherein said screen retaining means encloses the inner and outer peripheries of such cylindrical annulus to retain the adsorbent bed in a corresponding annular configuration.

3. Cryosorption apparatus according to claim 1 including a vessel within which said casing is positioned to provide an integral cryosorption unit, such vessel being provided with means for filling the vessel storage space around said casing with a cryogenic liquid refrigerant.

4. Cryosorption apparatus according to claim 1 wherein the width of said annular space is designed such that the gas conductance of said annular space matches the gas conductance of said gas inlet means.

5. Cryosorption apparatus according to claim 1 wherein said heat exchanger provides at least 70 sq. ft. of heat transfer surface area embedded in said adsorbent bed per cu. ft. of adsorbent material, and the ratio of heat exchanger heat transfer surface area enclosed by said adsorbent bed to the product of the exposed area of said adsorbent bed and the depth of the adsorbent bed between adjacent extended surface fin members exceeds 20 ft.$^2$/ft.$^3$.

6. Cryosorption apparatus according to claim 1 wherein a conduit extending through a casing end wall inwardly of said screen retaining means constitutes said gas inlet means and also means for filling and emptying said adsorbent material.

7. Cryosorption apparatus according to claim 1 in which the depth of the adsorbent material bed is less than about ¼ inch and the volume of adsorbent material is 30–75% of the gross volume of said casing.

8. Cryosorption apparatus according to claim 1 with conduit means for substantially uniformly distributing warm purge gas throughout the adsorbent material bed, and means for discharging such gas from the casing.

9. Cryosorption apparatus which comprises: a gastight casing having end and side walls; a heat exchanger positioned within the casing and comprising at least one refrigerant conduit longitudinally coextensive with the casing side walls and between the casing end walls; refrigerant inlet means communicating with one end of said refrigerant fluid conduit and refrigerant outlet means communicating with the opposite end of said refrigerant fluid conduit, a multiplicity of extended surface solid fin members spaced from each other around the major portion of the refrigerant fluid conduit exterior surface, being fixedly attached to and extending outwardly from such exterior surface with outer edges spaced from the inner surface of the casing side walls; screen retaining means enclosing the fin member outer surfaces and spaced inwardly from and substantially parallel to the casing side wall inner surface to form an annular space therebetween; a bed of adsorbent material packed around said fin members and filling the space therebetween, being enclosed by said screen retaining means such that said fin members are substantially completely surrounded by said adsorbent material with the outer periphery of said bed being directly exposed to said annular space; and gas inlet means connected to said casing in gaseous communication with the adsorbent bed and said annular space.

10. Cryosorption apparatus according to claim 9 in which said fin members are positioned substantially parallel to said refrigerant fluid conduit exterior surface.

11. Cryosorption apparatus according to claim 9 in which a plurality of refrigerant fluid conduits are provided and attached to the end wall of said casing; and wherein each refrigerant fluid conduit is surrounded by a separate screen as said screen retaining means.

References Cited

UNITED STATES PATENTS

| 2,955,807 | 10/1960 | Riley et al. | 55—269 X |
| 3,172,745 | 3/1965 | Needham et al. | 55—269 |
| 3,172,748 | 3/1965 | Feinleib et al. | 55—389 |

OTHER REFERENCES

Grant et al.: Multisurface Sorption Pump, in Review of Scientific Instruments, 34(5), pp. 587–588, May 1963.

REUBEN FRIEDMAN, *Primary Examiner.*

J. ADEE, *Assistant Examiner.*